United States Patent
Gupta et al.

(10) Patent No.: US 7,624,445 B2
(45) Date of Patent: Nov. 24, 2009

(54) SYSTEM FOR DYNAMIC NETWORK RECONFIGURATION AND QUARANTINE IN RESPONSE TO THREAT CONDITIONS

(75) Inventors: Pratik Gupta, Cary, NC (US); David Bruce Lindquist, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 10/868,122

(22) Filed: Jun. 15, 2004

(65) Prior Publication Data

US 2005/0278784 A1 Dec. 15, 2005

(51) Int. Cl.
*H04L 9/00* (2006.01)

(52) U.S. Cl. ............... 726/23; 726/1; 726/14; 726/24; 726/25; 726/26; 713/100; 709/221; 709/224; 709/225

(58) Field of Classification Search .......... 726/24, 726/25, 23, 1, 26, 2, 11; 709/221, 224
See application file for complete search history.

(56) References Cited

U.S. PATENT DOCUMENTS

| | | | | |
|---|---|---|---|---|
| 6,175,553 | B1 | 1/2001 | Luk et al. .......... | 370/222 |
| 6,981,158 | B1 * | 12/2005 | Sanchez et al. .......... | 726/2 |
| 7,076,801 | B2 * | 7/2006 | Gong et al. .......... | 726/11 |
| 7,089,589 | B2 * | 8/2006 | Chefalas et al. .......... | 726/22 |
| 7,134,012 | B2 * | 11/2006 | Doyle et al. .......... | 713/151 |
| 7,137,145 | B2 * | 11/2006 | Gleichauf .......... | 726/24 |
| 7,159,149 | B2 * | 1/2007 | Spiegel et al. .......... | 714/43 |
| 7,287,278 | B2 * | 10/2007 | Liang .......... | 726/22 |
| 7,360,245 | B1 * | 4/2008 | Ramachandran et al. ...... | 726/13 |
| 7,418,730 | B2 * | 8/2008 | Chu et al. .......... | 726/22 |
| 2001/0039579 | A1 * | 11/2001 | Trcka et al. .......... | 709/224 |
| 2002/0065938 | A1 | 5/2002 | Jungck et al. .......... | 709/246 |
| 2002/0112181 | A1 | 8/2002 | Smith .......... | 713/201 |
| 2002/0147915 | A1 * | 10/2002 | Chefalas et al. .......... | 713/188 |
| 2002/0152399 | A1 * | 10/2002 | Smith .......... | 713/200 |
| 2002/0188870 | A1 | 12/2002 | Gong et al. .......... | 713/201 |
| 2002/0199116 | A1 * | 12/2002 | Hoene et al. .......... | 713/201 |
| 2003/0041238 | A1 * | 2/2003 | French et al. .......... | 713/153 |
| 2003/0110395 | A1 | 6/2003 | Presotto et al. .......... | 713/201 |
| 2003/0126202 | A1 | 7/2003 | Watt .......... | 709/203 |
| 2003/0177216 | A1 | 9/2003 | Sutherland et al. .......... | 709/223 |
| 2003/0191957 | A1 * | 10/2003 | Hypponen et al. .......... | 713/200 |
| 2003/0191966 | A1 | 10/2003 | Gleichauf .......... | 713/201 |
| 2003/0200322 | A1 | 10/2003 | Childs et al. .......... | 709/229 |
| 2003/0208606 | A1 * | 11/2003 | Maguire et al. .......... | 709/227 |
| 2004/0003284 | A1 * | 1/2004 | Campbell et al. .......... | 713/201 |
| 2004/0064515 | A1 | 4/2004 | Hockey .......... | 709/206 |
| 2004/0093514 | A1 * | 5/2004 | Piazza et al. .......... | 713/201 |
| 2005/0033989 | A1 * | 2/2005 | Poletto et al. .......... | 713/201 |
| 2005/0076236 | A1 * | 4/2005 | Stephenson .......... | 713/201 |
| 2005/0204162 | A1 * | 9/2005 | Rayes et al. .......... | 713/201 |
| 2005/0267954 | A1 * | 12/2005 | Lewis et al. .......... | 709/221 |

\* cited by examiner

*Primary Examiner*—Nasser G Moazzami
*Assistant Examiner*—Shanto M Abedin
(74) *Attorney, Agent, or Firm*—Yee & Associates, P.C.

(57) ABSTRACT

A method, apparatus, and computer instructions for responding to a threat condition within the network data processing system. A threat condition within the network data processing system is detected. At least one routing device is dynamically reconfigured within the network data processing system to isolate or segregate one or more infected data processing systems within the network data processing system. This dynamic reconfiguration occurs in response to the threat condition being detected.

23 Claims, 4 Drawing Sheets

SYSTEM FOR DYNAMIC NETWORK RECONFIGURATION AND QUARANTINE IN RESPONSE TO THREAT CONDITIONS

BACKGROUND OF THE INVENTION

1. Technical Field

The present invention relates generally to an improved data processing system and in particular to a method and apparatus for processing data. Still more particularly, the present invention relates to a method, apparatus, and computer instructions for responding to threat conditions.

2. Description of Related Art

Computers and computer networks are vulnerable to threats. These threats include, for example, viruses, worms, and Trojan horses. A virus is a small piece of software that may piggyback itself on a real program. For example, a virus may attach itself to a spreadsheet program. Each time the spreadsheet program is run, the virus also runs and may spread and cause mischief or damage. A worm is a small piece of software that exploits computer networks and security holes to replicate itself and spread. A Trojan horse is a computer program that may claim to perform one function, but performs another, such as erasing a hard disk drive. A threat condition indicates that an infection is present in a set of computers or a network. The level of infection of a set of computer systems or network by viruses or worms determines the threat condition of the network as a whole. If more systems are infected or if the infection is a particularly virulent form of a worm, the threat condition is considered to be high.

Current responses to a threat condition, such as a worm infection, include running virus scanning software on all data processing systems in the network, closing or turning off ports where the worm has been detected, and installing patches to fix security holes. All of these methods are labor intensive and do not affect collections of data processing systems. Further, these methods do not result in any intelligent response to the worm posing the threat condition. A brute force cleaning operation is required to remove the threat. This brute force cleaning may require network administrators to painstakingly comb through the different data processing systems, storage media, and other devices on the network to remove or eradicate the worm. The current processes are performed on a per system response, which is very time consuming. Similar actions are required with respect to viruses.

The current methods used to respond to threat conditions are very labor intensive and time consuming. Thus, it would be advantageous to have an improved method, apparatus, and computer instructions for responding to threat conditions.

SUMMARY OF THE INVENTION

The present invention provides a method, apparatus, and computer instructions for responding to a threat condition within the network data processing system. A threat condition within the network data processing system is detected. At least one routing device is dynamically reconfigured within the network data processing system to isolate or segregate one or more infected data processing systems within the network data processing system. This dynamic reconfiguration occurs in response to the threat condition being detected.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
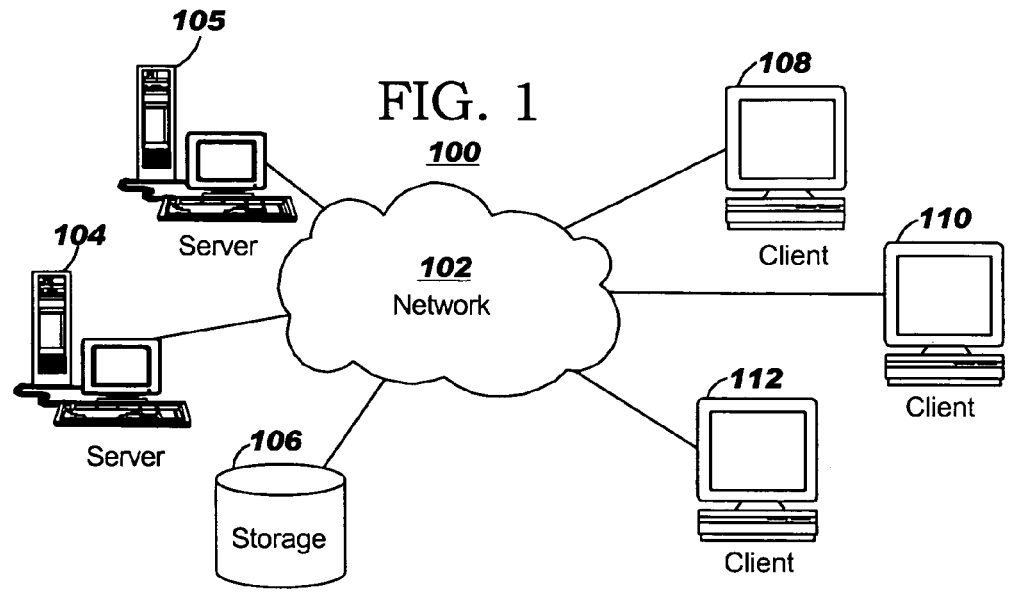
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables. Network 102 also includes routers and switches to facilitate the routing of traffic through network 102.

In the depicted example, server 104 and server 105 are connected to network 102 along with storage unit 106. In addition, clients 108, 110, and 112 are connected to network 102. These clients 108, 110, and 112 may be, for example, personal computers or network computers. In the depicted example, server 104 and server 105 provides data, such as boot files, operating system images, and applications to clients 108-112. Clients 108, 110, and 112 are clients to server 104 and server 105. Network data processing system 100 may include additional servers, clients, and other devices not shown.

In the depicted example, network data processing system 100 is a local area network (LAN). Network 102 represents transmission media, including wires, fiber optic cables, and wireless links. Routing of data within network 102 occurs through the use of routing devices, such as switches and routers.

Alternatively, this system may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

Of course, network data processing system 100 also may be implemented using one or more of a number of different types of networks, such as for example, an intranet, a local area network, or a wide area network (WAN). FIG. 1 is intended as an example, and not as an architectural limitation for the present invention.

The present invention provides a method, apparatus, and computer instructions for dynamic network reconfiguration and quarantine in response to detecting threat conditions, such as viruses or worms. The mechanism of the present invention allows for network 102 to be reconfigured to separate infected data processing systems from non-infected data processing systems. In the depicted examples described below, this reconfiguration is accomplished by reconfiguring routing devices, such as switches and routers and may include other software such as Dynamic Host Configuration Protocol (DHCP) servers and even clients and servers directly. The reconfiguration mechanism of the present invention is not limited to the illustrated routing devices. The mechanism may be applied to other routing devices, routing configuration software such as a DHCP server or even client configurations may be reconfigured.

Figure 2:
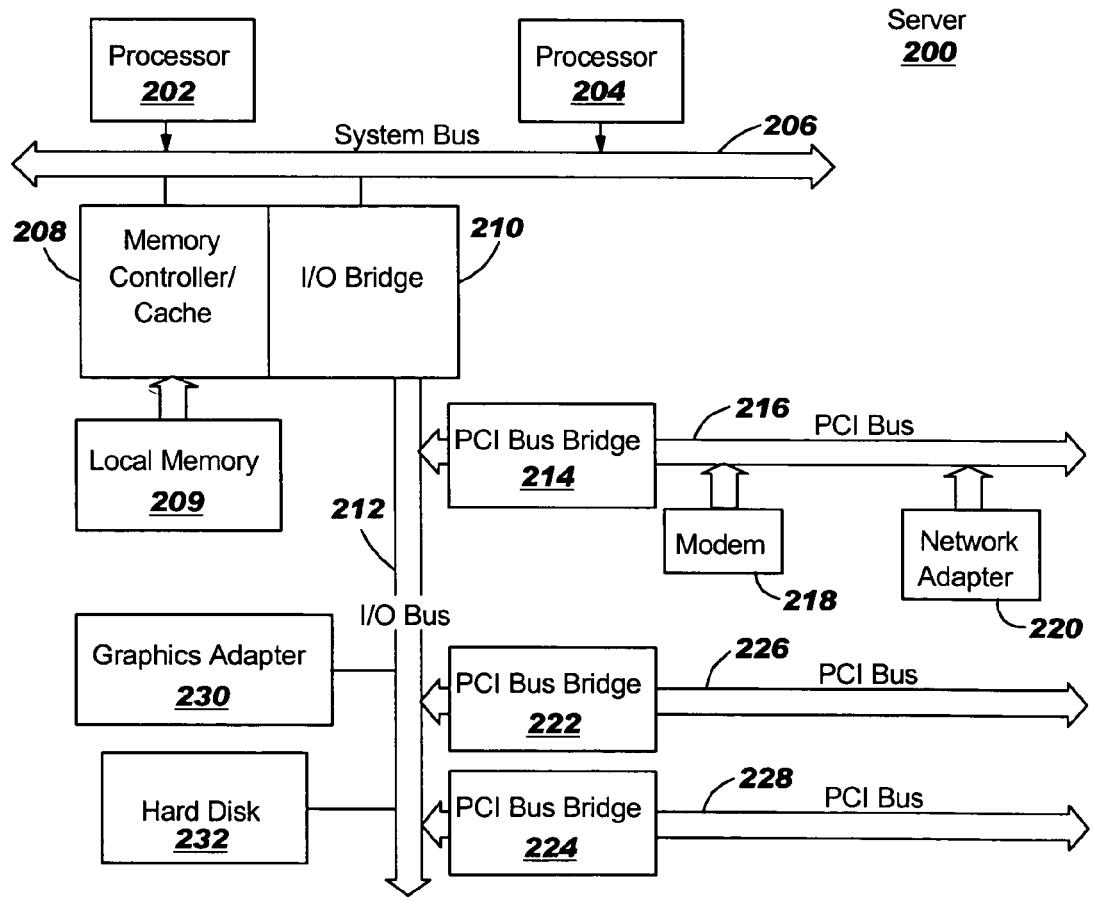
FIG. 2 is a block diagram of a data processing system that may be implemented as a server, in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system. Additionally, data processing system 200 also may be implemented as a client, such as client 108 in FIG. 1.

Further, data processing system 200 may serve as a hardware platform for the processes used to initiate reconfiguration of routing devices. These processes may be incorporated into a provisioning manager or another administrative program for use in remotely configuring routing devices. An example of a provisioning manager is IBM Tivoli Provisioning Manager, which is available from International Business Machines Corporation. Any software product that is capable of configuring router and switch and DHCS server configurations may be used to implement the mechanism of the present invention. Further, the present invention is not limited to a single software component, but may be implemented in a combination of software components.

In the illustrative examples, this reconfiguration includes separating and isolating infected portions of a network from uninfected portions of a network when a threat condition is detected. Specifically, the reconfiguration may separate a subnet structure into two or more different subnets. When a network is divided into smaller networks connected by routers, these smaller networks are referred to as subnets.

Figure 3:
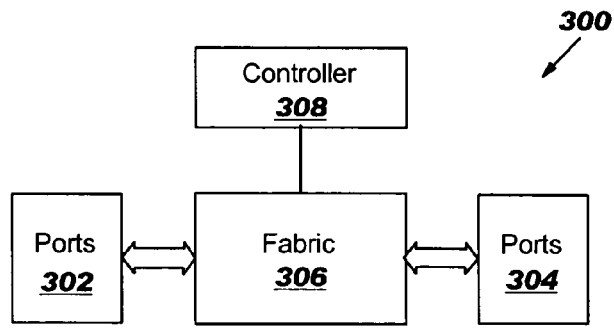
FIG. 3 is a diagram of a routing device in accordance with a preferred embodiment of the present invention.

Turning now to FIG. 3, a diagram of a routing device is depicted in accordance with a preferred embodiment of the present invention. Switch 300 is an example of a routing device that may be dynamically reconfigured to reconfigure a network for isolating threat conditions.

As shown, switch 300 includes ports 302 and 304, which send and receive traffic on a network, such as network 102 in FIG. 1. The routing of the traffic through switch 300 occurs in fabric 306. This routing is controlled by controller 308. Fabric 306 may take many forms.

Three examples of fabrics include shared memory, matrix, and bus architecture. With shared memory, all incoming packets are stored in a common memory buffer that is shared by ports 302 and 304. The incoming packets are then sent out to the correct port for the destination. A matrix contains an internal grid in which ports 302 and 304 are configured as either input ports or output ports. Input ports and output ports cross each other. When a data packet is detected on an input port, a media access control (MAC) address is compared to find the appropriate output port. A connection is made on the grid where these two ports intersect. With a bus architecture, an internal transmission path is shared by ports 302 and 304 using time division multiple access (TDMA).

Controller 308 may take various forms, such as a processor or application specific integrated circuit (ASIC). The mechanism of the present invention sends instructions to controller 308 to reconfigure switch 300 to separate a network into two subnets in these illustrative examples as part of a process to respond to a threat condition.

Of course, the mechanism of the present invention also may be implemented using a router in these illustrative examples. The switching function provided by switch 300 typically is to logically connect data processing systems on the same subnet together so that these data processing systems they think they are on the same wire. A router moves data between subnets or between data processing systems that think that they are on a different wire. Routers also may include switches.

Figure 4B:
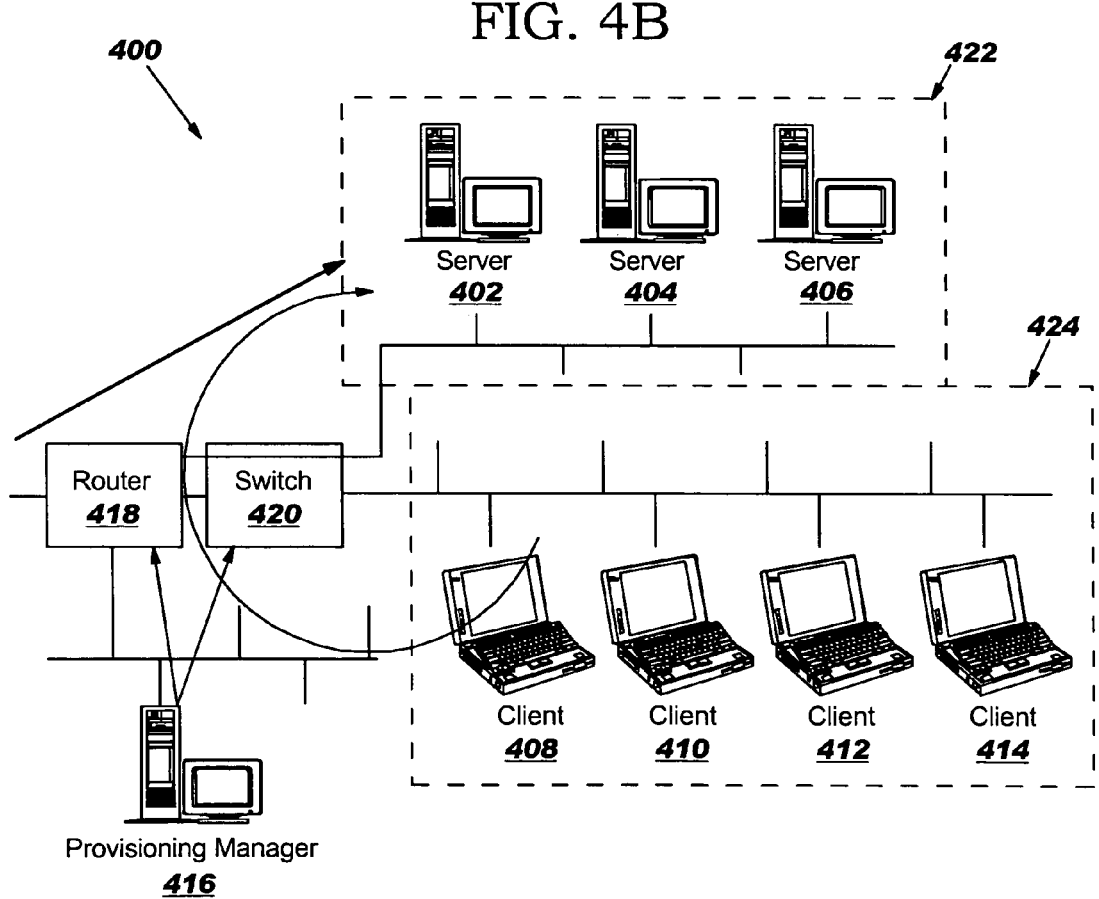
FIGS. 4A and 4B are diagrams illustrating reconfiguration of a network in accordance with a preferred embodiment of the present invention.
Figure 4A:
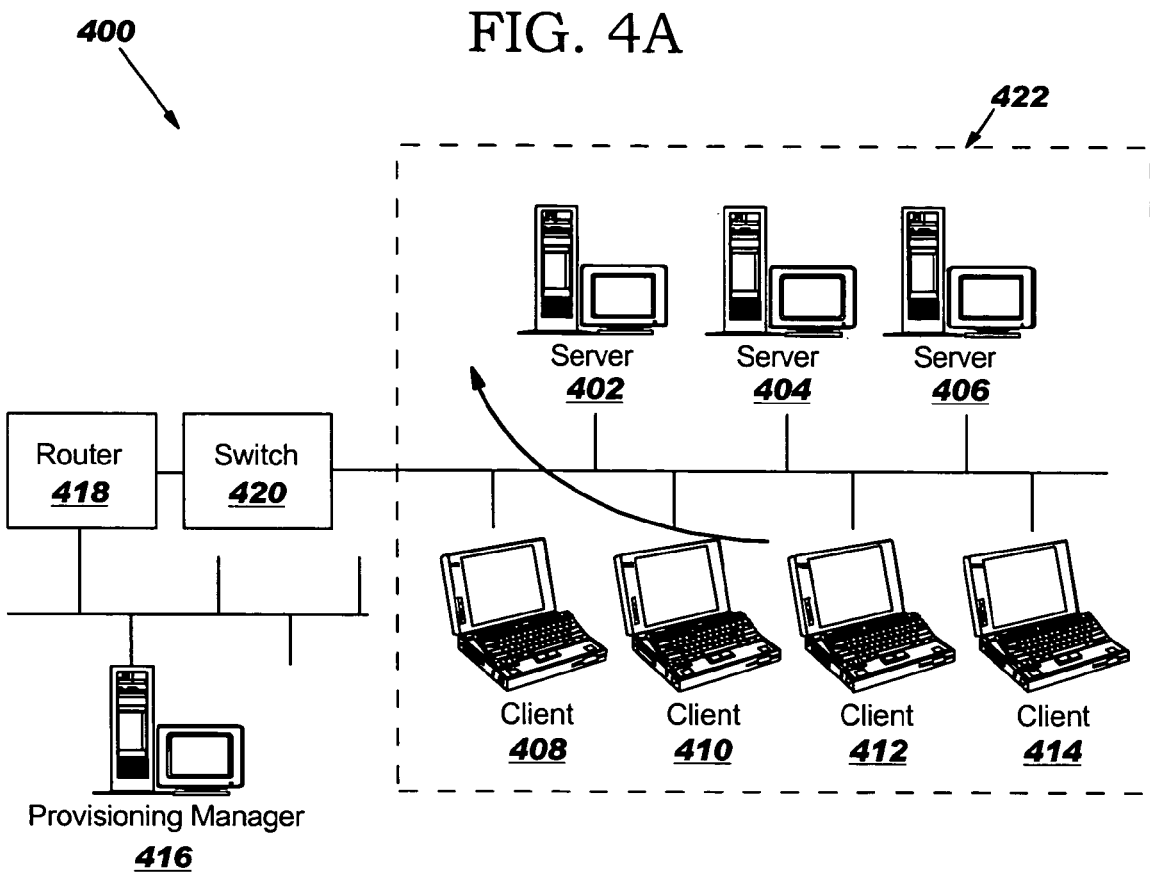

Turning now to FIGS. 4A and 4B, diagrams illustrating reconfiguration of a network are depicted in accordance with a preferred embodiment of the present invention. In FIG. 4A, network 400 includes servers 402, 404, and 406. Network 400 also includes clients 408, 410, 412, and 414 as well as provisioning manager 416. Traffic is routed within network 400 using routing devices, such as router 418 and switch 420. In this example, network 400 includes a single subnet, subnet 422, which contains server 402, server 404, server 406, client 408, client 410, client 412, and client 414.

In this example, a worm has infected clients 408, 410, 412, and 414. Servers 402, 404, and 408 are not infected. This worm forms a threat condition, which may be detected through various currently used mechanisms. For example, a network intrusion device may identify the worm. With respect to other conditions, other currently used mechanisms may be employed. For example, if the threat condition is caused by a virus, virus checking software is used to detect this type of threat condition.

When a threat condition, such as the worm infecting clients 408, 410, 412, and 414 are detected by provisioning manager 416, the mechanism of the present invention dynamically reconfigures network 400 into two subnets, subnet 422 and subnet 424 as shown in FIG. 4B. In this manner, servers 402, 404, and 406 may be separated from clients 408, 410, 412, and 414 in a manner that allows these clients to maintain connectivity to networks external to network 400.

Further, limited connectivity to the servers may be provided. For example, the limited connectivity may be provided through the filter of data packets in traffic from clients 408, 410, 412, and 414 to servers 402, 404, and 406. In this illustrative example, web access traffic may be allowed while email traffic is denied with respect to these servers from the infected clients. The exact filtering may be implemented through a policy configured from the provisioning manager 416 onto router 418 for implementation.

The reconfiguration of routing devices may be accomplished through provisioning manager 416 using drivers or software that facilitate changes in the configuration of router 418. This router implements protocols that allow routing information to be updated in a network.

Examples of protocols that may be used to change routing information in a network are Routing Information Protocol (RIP) v1 and RIP v2. These protocols allow for exchanging routing information among different components in a network. Other protocols exist that allow subnet and routing information to be changed. These include Dynamic Host Configuration Protocol (DHCP) or Router Advertisements (in IPv6). In particular, the mechanism of the present invention changes subnet information in the different data processing systems to split a single subnet into two or more subnets. Although the depicted example shows two subnets being formed, other numbers of subnets may be created in isolating the threat condition.

In these illustrative examples, provisioning manager 416 may send instructions to a routing device, such as router 418 to advertise or transmit subnet changes. Router 418 advertises mask changes to change subnets for different IP addresses or ranges of IP addresses. Such an advertisement may be performed in Internet Protocol Version 4 (IPv4) or Version 6 (IPv6), in different ways. Client IP addresses may be allocated such as the following: 0x . . . . . . . 0001, 0x . . . . 0002, . . . until 0x . . . . 000E. the prefix of the IP denoted by . . . is not relevant to illustrate this example. Server addresses may be allocated as follows: 0x . . . . . . F1, 0x . . . . . F2, . . . until 0x . . . . . . . . FE. These data processing systems may be on the same subnet if the mask is inclusive of these addresses, such as 0x . . . . . F00. The subnet may be changed by simply changing the mask to 0x . . . . . . F80. This mask changes the subnet for the server and the clients, while the IP addresses stay the same.

Although the illustrative examples depict reconfiguring a network by creating subnets to isolate threat conditions, other mechanisms may be used depending on the particular implementation. For example, a router or switch may be instructed to handle traffic from selected IP addresses differently. For example, traffic having IP addresses from infected clients may be prevented from being routed to uninfected servers, while traffic from infected clients may be allowed to pass to destinations external to the network.

The following is an example to illustrate a reconfiguration within a network. In this illustrative example, a group of computer systems, such as clients and servers, are placed in a network so that they can communicate with each other. In the depicted example, the network contains a subnet and virtual local area network (VLAN). Due to some unforeseen condition, such as a new security threat condition, the computer systems in the network need to be dynamically separated into different subnets and VLANS.

In accordance with an illustrative embodiment of the present invention, many ways of performing this separation or dynamic reconfiguration may be used. The particular mechanism for this reconfiguration is selected in these examples based on the applications running and the desired behavior.

In the case that the network is using IPV4, clients and servers are allocated addresses via DHCP. Clients and servers can be allocated addresses out of the same subnet but different part of the address range by using DHCP user class option. For example, in a subnet 9. 27.134. 0, subnet mask 255.255.255.0, clients may be allocated addresses from 9.27.134.2 onwards (9.27.134.3, . . . . . . ). It is customary but not mandatory to use 0.1 or 0.128 or 0.254 as the default router. Servers may be allocated addresses like 9.27.134.130, 9.27.134.131. The default router in this example is 9.27.134.1. At this time, all the servers and clients are on the same subnet.

DHCP requires that computers renew their IP addresses periodically in order to continue to use that IP address. This protocol of renewing IP address use also includes the default router and subnet mask that the clients need to use. The administrators can set short lease times to determine the time limit within which the separation needs to be accomplished.

Upon needing to separate the clients from the servers or separate any arbitrary set of data processing systems or devices from any other, the DHCP server may be dynamically configured to now send a different subnet mask and default router. As a result, a possible separation can be one in which the clients keep the same IP address, but the subnet mask is 255.255.255.128. In this separation, the default router is 9.27.134.1. The servers keep the same IP address, but the mask is 255.255.255.128 and the default router is 9.27.134.254. This type of separation requires router configuration to be changed appropriately. Additionally, although one need not assign the clients and servers addresses from different ranges for this reconfiguration to work, this type of assignment provides for a more elegant reconfiguration.

If the network uses IPV6, unlike IPv4, IPv6 supports an interface having multiple addresses assigned to it simultaneously. Each address has two lifetimes associated with it. A preferred lifetime indicates an address that can be used for any purpose. A valid lifetime indicates at what point an address becomes completely unusable. Addresses that are valid, but for which the preferred lifetime has expired are said to be deprecated. To support renumbering, the "old" address is deprecated, causing the system to stop using it for new communication.

Existing communication, such as TCP connections, already using the address continue doing so. Simultaneously, a new address is assigned with a normal preferred lifetime. Any new communication will use the new address rather than the old address. Over time, as old connections close and new ones get created, less and less traffic will be using the old address and after a suitable transition period, the address can be removed completely with only minimal impact. In contrast, with IPv4, only one address can be in use at any given time, so a graceful transition is not possible; switching to a new address causes all existing communication to abort.

An example of an address for a client is 2001:DB8:0:1:xxx in which xxx is any number that identifies a particular host on the subnet. An example of an address for a server is 2001: DB8:0:128:xxx. The prefix could be 2001:DB8:0/48 with one prefix covering both blocks.

Alternatively, a new configuration may be used after the changes have been made. For example, the address may be 2001:db8:0:1/64 (covering just the client subnet) and 2001: DB8:0:128/64 (covering just the server subnet).

Figure 5:
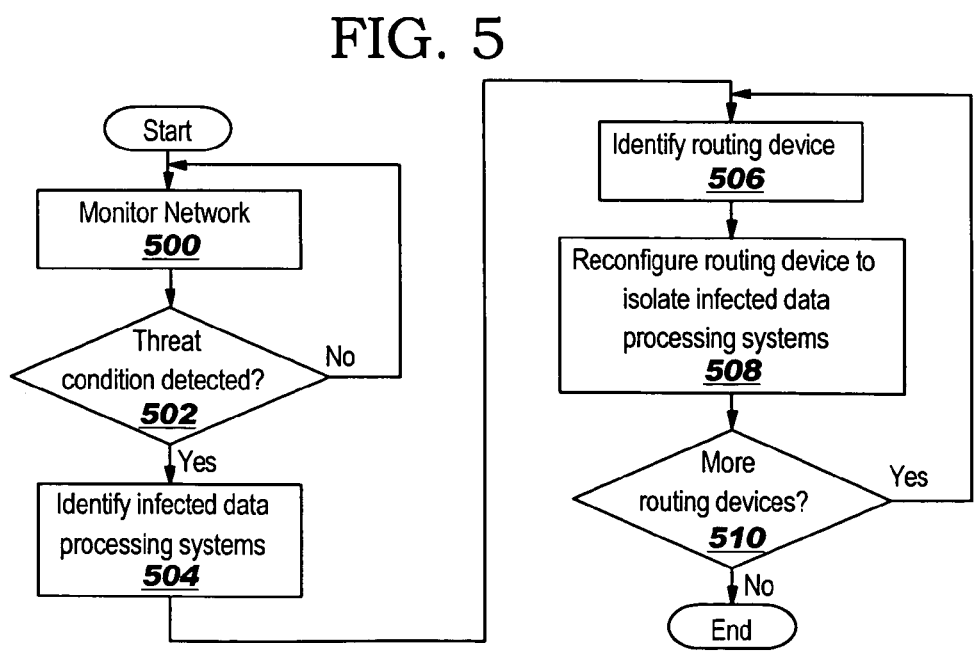
FIG. 5 is a flowchart of a process for monitoring a network for threat conditions in accordance with a preferred embodiment of the present invention.

With reference now to FIG. 5, a flowchart of a process for monitoring a network for threat conditions is depicted in accordance with a preferred embodiment of the present invention. The process illustrated in FIG. 5 may be implemented in a data processing system, such as data processing system 200 in FIG. 2. Such a data processing system is configured to function as a provisioning manager, such as provisioning manager 416 in FIG. 4A.

The process begins by monitoring the network (step 500). This monitoring may include waiting for alerts of threat conditions generated by components, such as virus checking programs and intrusion detection devices located in the network. Next, a determination is made as to whether a threat condition is detected (step 502). If a threat condition is detected, then infected data processing systems are identified (step 504).

A number of known methods are present for identifying the infected systems. For example, a network intrusion detection system may be used. This device monitors the network traffic and looks for known signatures of worms on the network by analyzing the data packets. By looking at data in the data packets, these types of systems can identify the network adapter and hence the IP address of the machine that is responsible for transmitting the packet. Each data packet contains the source address of the sender. In another example, infected systems may be identified by looking at alerts from virus detection systems. A number of virus scanning programs can be set up to send alerts to an external system upon detecting a virus. This alert contains information to identify the source system.

Then, a routing device is identified (step 506). Next, the routing device is reconfigured to isolate infected data processing systems (step 508). For example, the routing device may be instructed to broadcast or advertise a mask to change subnets for the infected data processing systems such that all of the data processing systems are placed into a subnet separate from the uninfected data processing systems (In IPv6) or in conjunction with configuring the DHCP server function within the routing device. Additionally, the routing device may separate the uninfected data processing systems from the infected data processing systems by changing the networking parameters of the infected data processing systems. This reconfiguration also may include sending policies or filters to the routing device for use in allowing the infected data processing systems limited access to the other subnets or access to external networks, such as the Internet. Then, a determination is made as to whether more routing devices are present that need to be reconfigured (step 510). If more routing devices are not present then the process terminates.

Referring back to step 502, if a threat condition is not detected, then the process returns to step 500 as described above. In step 510, if more routing devices are present, then the process returns to step 506 as described above.

Figure 6:
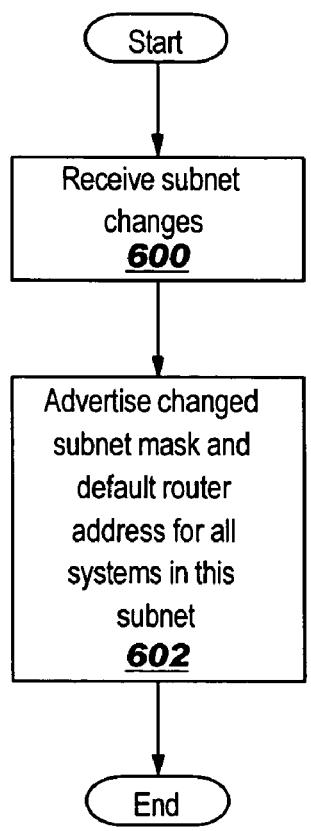
FIG. 6 is a flowchart of a process for subnet changes in accordance with a preferred embodiment of the present invention.

With reference now to FIG. 6, a flowchart of a process for subnet changes is depicted in accordance with a preferred embodiment of the present invention. The process illustrated in FIG. 6 may be implemented in a routing device, such as routing device 418 or switch 420 or a DHCP server in conjunction with a routing device in FIG. 4A.

The process begins by receiving subnet changes (step 600). These instructions are received from a data processing system, such as provisioning manager 416 in FIG. 4A. Next, a new subnet mask and router is advertised for the data processing systems in the affected subnet (step 602). The router is advertised by sending the default router address to the data processing systems in the subnet (using IPV6 router advertisements). The process terminates thereafter. This subnet mask is constructed to cause the infected data processing systems and the uninfected data processing systems to switch to a different subnet, without affecting the IP addresses of either sets of data processing systems in these illustrative examples. As a result, the infected data processing systems are unable to directly contact or talk to the uninfected data processing systems, while other data processing systems external to this subnet can continue to communicate with the servers.

Figure 7:
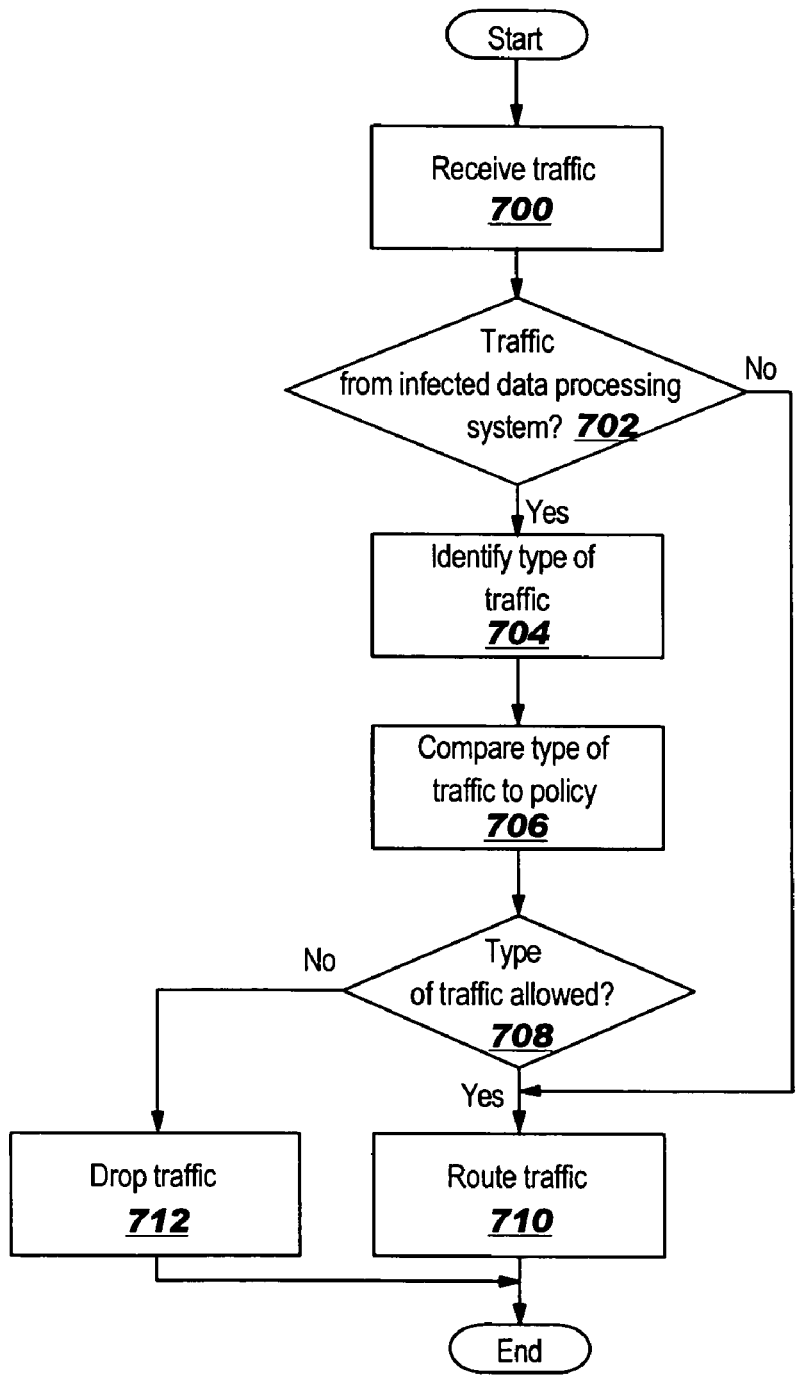
FIG. 7 is a flowchart of a process for filtering traffic in accordance with a preferred embodiment of the present invention.

With reference now to FIG. 7, a flowchart of a process for filtering traffic is depicted in accordance with a preferred embodiment of the present invention. The process illustrated in FIG. 7 may be implemented in a routing device, such as router 418 or switch 420 in FIG. 4A.

The process begins by receiving traffic (step 700). In these examples, the traffic contains data packets. Next, a determination is made as to whether the traffic is from an infected data processing system (step 702). If the traffic is from an infected data processing system, then the type of traffic is identified (step 704). The traffic may be, for example, requests for web pages or email messages.

Then, the type of traffic is compared to the policy (step 706). Next, a determination is made as to whether the type of traffic is allowed (step 708). For example, the policy may allow requests for web pages to reach the destination, while data packets for email messages are prohibited. If the type of traffic is allowed, then the traffic is routed to the destination (step 710) with the process terminating thereafter.

Referring back to step 702, if the traffic is not from an infected data processing system, then the process proceeds to step 710 as described above. In step 708, if the type of traffic is not allowed, then the traffic is dropped (step 712) with the process terminating thereafter.

Thus, the present invention provides an improved method, apparatus, and computer instructions for responding to threat conditions. The mechanism of the present invention dynamically reconfigures the network to isolate or quarantine data processing systems in which threat conditions exist. The mechanism of the present invention provides for remotely reconfiguring routing devices in a network to isolate infected data processing systems. This mechanism allows for a rapid response to threat conditions without requiring labor intensive actions to isolate the threats.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a network data processing system for responding to threat conditions, the method comprising computer implemented steps of:
   detecting a threat condition within the network data processing system;
   responsive to detecting the threat condition, dynamically reconfiguring at least one routing device within the network data processing system to change routing information and subnet information for the at least one routing device to isolate an infected data processing system within the network data processing system, wherein changing the subnet information further comprises separating a network associated with the network data processing system into two or more smaller networks connected by routing devices to form two or more subnets, and wherein isolating the infected data processing system includes placing the infected data processing system in a different subnet than a non-infected data processing system;
   sending instructions to the at least one routing device to advertise the changed subnet information, wherein the changed subnet information includes a new subnet mask and router for the infected data processing system, and wherein the new subnet mask and router does not affect the internet protocol address of either the infected data processing system or the non-infected data processing system; and
   sending policies and filters to the at least one routing device, wherein the policies and filters limit access to external networks and other subnets by the infected data processing system by filtering data packets received in traffic from the infected data processing system and processing the data packets based on at least one policy.

2. The method of claim 1, wherein the at least one routing device includes at least one of a router and a switch.

3. The method of claim 1, wherein the infected data processing system maintains connectivity to another network outside of the network data processing system while being separated from a server data processing system.

4. The method of claim 1, wherein the dynamically reconfiguring step is performed by a provisioning manager within the network data processing system.

5. The method of claim 1, wherein the network data processing system includes at least one of a local area network, a wide area network, an intranet, or an Internet.

6. The method of claim 1, further comprising:
   receiving traffic at the at least one routing device from the infected data processing system;
   identifying a type for the traffic received from the infected data processing system to form an identified type of traffic from the infected data processing system;
   comparing the identified type of traffic from the infected data processing system to the at least one policy; and
   determining whether the identified type of traffic is allowed based on the at least one policy.

7. The method of claim 6, further comprising:
   responsive to a determination that the identified type of traffic is allowed, routing the traffic received from the infected data processing system to a destination.

8. The method of claim 6, further comprising:
   responsive to a determination that the identified type of traffic is not allowed, dropping the traffic received from the infected data processing system, wherein dropping the traffic includes prohibiting the traffic to reach a destination.

9. A network data processing system comprising:
   a network;
   a set of data processing systems connected to the network;
   a number of routing devices connected to the network, wherein the number of routing devices route traffic in the network; and
   a provisioning manager, wherein the provisioning manager dynamically reconfigures at least one routing device to change routing information and subnet information for the at least one routing device to isolate an infected data processing system in a set of data processing systems in response to detecting a threat condition in the infected data processing system, wherein changing the subnet information further comprises separating the network into two or more smaller networks connected by the at least one routing device to form two or more subnets, wherein isolating the infected data processing system includes placing the infected data processing system in a different subnet than a non-infected data processing system, wherein the provisioning manager further sends instructions to the at least one routing device to advertise the changed subnet information, wherein the changed subnet information includes a new subnet mask and router for the infected data processing system, wherein the new subnet mask and router does not affect the internet protocol address of either the infected data processing system or the non-infected data processing system; wherein the provisioning manager further sends policies and filters to the at least one routing device, wherein the policies and filters limit access to external networks and other subnets by the infected data processing system by filtering data packets received in traffic from the infected data processing system and processing the data packets based on at least one policy.

10. The network data processing system of claim 9, wherein the provisioning manger is located on one of the data processing systems in the set of data processing systems.

11. The network data processing system of claim 9, wherein the routing devices includes at least one of a router and a switch.

12. The network data processing system of claim 9, wherein the infected data processing system maintains connectivity to another network outside of the network data processing system while being separated from a server data processing system.

13. The network data processing system of claim 9, wherein the network data processing system includes at least one of a local area network, a wide area network, an intranet, or an Internet.

14. The network data processing system of claim 9, wherein the at least one routing device receives traffic from the infected data processing system, identifies a type for the traffic received from the infected data processing system to form an identified type of traffic, compares the identified type of traffic from the infected data processing system to the at least one policy, and determines whether the identified type of traffic is allowed based on the at least one policy.

15. The network data processing system of claim 14, wherein the at least one routing device routes the traffic received from the infected data processing system to a destination in response to a determination that the identified type of traffic is allowed.

16. The network data processing system of claim 14, wherein at least one routing device drops the traffic received from the infected data processing system in response to a determination that the identified type of traffic is not allowed, and wherein dropping the traffic includes prohibiting the traffic to reach a destination.

17. A computer recordable storage medium storing a computer program product for responding to threat conditions in a network data processing system, the computer program product comprising computer usable program code for:
   detecting a threat condition within the network data processing system; responsive to detecting the threat condition, dynamically reconfiguring at least one routing device within the network data processing system to change routing information and subnet information for the at least one routing device to isolate an infected data processing system within the network data processing system, wherein changing the subnet information further comprises separating a network associated with the network data processing system into two or more smaller networks connected by routing devices to form two or more subnets, and wherein isolating the infected data processing system includes placing the infected data processing system in a different subnet than a non-infected data processing system;
   sending instructions to the at least one routing to advertise the changed subnet information, wherein the changed subnet information includes a new subnet mask and router for the infected data processing system, and wherein the new subnet mask and router does not affect the internet protocol address of either the infected data processing system or the non-infected data processing system; and
   sending policies and filters to the at least one routing device, wherein the policies and filters limit access to external networks and other subnets by the infected data processing system by filtering data packets received in traffic from the infected data processing system and processing the data packets based on at least one policy.

18. The computer recordable storage medium of claim 17, wherein the at least one routing device includes at least one of a router and a switch.

19. The computer recordable storage medium of claim 17, wherein the infected data processing system maintains connectivity to another network outside of the network data processing system while being separated from a server data processing system.

20. The computer recordable storage medium of claim 17, wherein the network data processing system includes at least one of a local area network, a wide area network, an intranet, or an Internet.

21. The computer recordable storage medium of claim 17, further comprising computer usable program code for:
   receiving traffic at the at least one routing device from the infected data processing system;
   identifying a type for the traffic received from the infected data processing system to form an identified type of traffic from the infected data processing system;
   comparing the identified type of traffic from the infected data processing system to the at least one policy; and
   determining whether the identified type of traffic is allowed based on the at least one policy.

22. The computer recordable storage medium of claim 21, further comprising computer usable program code for:
   responsive to a determination that the identified type of traffic is allowed, routing the traffic received from the infected data processing system to a destination.

23. The computer recordable storage medium of claim 21, further comprising computer usable program code for:
   responsive to a determination that the identified type of traffic is not allowed, dropping the traffic received from the infected data processing system, wherein dropping the traffic includes prohibiting the traffic to reach a destination.

* * * * *

UNITED STATES PATENT AND TRADEMARK OFFICE
CERTIFICATE OF CORRECTION

PATENT NO.      : 7,624,445 B2                                Page 1 of 1
APPLICATION NO. : 10/868122
DATED           : November 24, 2009
INVENTOR(S)     : Gupta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1171 days.

Signed and Sealed this

Twenty-sixth Day of October, 2010

David J. Kappos
*Director of the United States Patent and Trademark Office*